United States Patent [19]

Suzuki

[11] Patent Number: 4,605,722
[45] Date of Patent: Aug. 12, 1986

[54] METHOD FOR SUPPRESSING THE GENERATION OF HYDROGEN GAS FROM CURED SILICONE MATERIALS

[75] Inventor: Toshio Suzuki, Ichihara, Japan

[73] Assignee: Toray Silicone Co., Ltd., Tokyo, Japan

[21] Appl. No.: 745,113

[22] Filed: Jun. 17, 1985

[30] Foreign Application Priority Data

Jun. 29, 1984 [JP] Japan ................ 59-134541

[51] Int. Cl.⁴ .................................... C08G 77/06
[52] U.S. Cl. ............................ 528/15; 528/31; 528/32
[58] Field of Search ............... 528/15, 31, 32

[56] References Cited

U.S. PATENT DOCUMENTS 4,032,502 6/1977 Lee et al. .................. 528/15
4,472,562 9/1984 Shirahata .................. 528/15
4,472,563 9/1984 Chandra et al. ............ 528/15

Primary Examiner—Melvyn I. Marquis
Attorney, Agent, or Firm—Roger H. Borrousch

[57] ABSTRACT

Contacting cured addition-type cured silicone material with hydrogen gas suppressing materials which are compounds containing phosphorus, sulfur, nitrogen, or aliphatic unsaturation reduces or eliminated the undesirable hydrogen gas generation. Examples of such hydrogen gas suppressing materials are triethylphosphine, γ-mercaptopropyltrimethoxysilane, N,N-diethylaminoethanol, 3-methyl-1-butyne-3-ol, and 11 Claims, No Drawings

METHOD FOR SUPPRESSING THE GENERATION OF HYDROGEN GAS FROM CURED SILICONE MATERIALS

BACKGROUND OF THE INVENTION

1. Field of the Invention

This invention relates to a method for suppressing the generation of hydrogen gas from cured silicone materials.

2. Background Information

Silicone compositions which cure into rubbers, resins, or gels by the addition reaction of lower alkenyl groups with silicon-bonded hydrogen atoms (SiH below) in the presence of a platinum catalyst have diverse applications. It is characteristic of such silicone compositions (denoted below as addition reaction-type silicones) that the SiH/lower alkenyl group molar ratio is not 1/1, but rather excess SiH is present as a crosslinking component in order to achieve a stable curing rate and in order to maintain excellent properties in the cured material.

3. Problems to be Solved by the Method of this Invention

It is known that the excess SiH as mentioned above may react with water or OH groups in the presence of the platinum catalyst to produce hydrogen gas and that this may inhibit the use of an addition reaction-type silicone. Thus, the generated hydrogen gas forms bubbles which may cause defects in materials in the vicinity of the silicone or the silicone may become an ignition source or may unnecessarily activate a gas alarm.

The goal of this invention is to eliminate the above-mentioned drawbacks to addition reaction-type cured silicone materials in the prior art.

SUMMARY OF THE INVENTION

This invention relates to a method for suppressing the generation of hydrogen gas from cured silicone material which is cured by the addition reaction of lower alkenyl groups with silicon-bonded hydrogen atoms in the presence of a platinum catalyst comprising bringing the cured silicone material into contact with a gaseous, liquid, or dissolved hydrogen gas suppressing material selected from the group consisting of phosphorus compound, sulfur compound, nitrogen compound, or compound containing an aliphatically unsaturated bond, and thereafter removing the cured silicone material from the hydrogen gas suppressing material.

DETAILED DESCRIPTION OF THE INVENTION

The cured silicone material specified in this invention is a composition whose principal components are an organopolysiloxane containing lower alkenyl groups such as vinyl or allyl, an organopolysiloxane possessing SiH, and platinum or a platinum compound as the catalyst and which has been cured at an elevated temperature or room temperature. Said cured materials may have various properties such as the properties of a hard resin, rubber, or soft gel depending on the crosslinking density and on the quantity of filler. As discussed above, the SiH/lower alkenyl group molar ratio in these compositions characteristically exceeds one with the result that the excess SiH causes hydrogen gas evolution.

Various methods were examined by the present inventor and it was surprisingly discovered that hydrogen gas generation could be significantly suppressed by bringing the above-mentioned cured silicone material into contact with a specific substance.

The substances which can suppress hydrogen gas generation are gaseous, liquid, or dissolved hydrogen gas suppressing material selected from phosphorus compounds, sulfur compounds, nitrogen compounds, or compounds possessing an aliphatically unsaturated bond. Their chemical structures and properties are arbitrary. In addition, said substance may contain any combination of 2 to 4 constituents selected from among phosphorus atoms, sulfur atoms, nitrogen atoms, and aliphatically unsaturated bonds.

Said substance takes the form of a gas, liquid, or solution at the time of treating the cured silicone material. Gases are preferred for their infiltrability into cured silicone materials while the liquid substance must have a low viscosity. In the dissolved form, the originally solid or liquid substance has been dissolved in a solvent. The solvent must exhibit an excellent infiltrability into the cured silicone material. The substance must contain $\geq 0.1$ wt % phosphorus, sulfur, nitrogen, or aliphatically unsaturated bond ($>C=C<$ or $-C\equiv C-$). In order to accomplish the goal of this invention effectively, the phosphorus compound, sulfur compound, or nitrogen compound preferably possesses a lone electron pair on the phosphorus, sulfur, or nitrogen atom or should form a chemical bond, such as a coordination or ionic bond, with platinum. The reason why this substance can suppress hydrogen gas generation may be that the platinum catalyst is inactivated or the excess SiH is reacted.

Examples of the phosphorus compound are triorganophosphines, diorganophosphines, triorganophosphites, and organophosphonic acids; examples of the sulfur compound are organomercaptans, diorganosulfides, diorganosulfoxides, mercapto group-containing organosilanes, and hydrogen sulfide; examples of the nitrogen compounds are ammonia, primary, secondary, and tertiary alkylamines, arylamines, alkylarylamines, N,N-diorganoamino alcohols, urea, thiourea, pyrimidine, picoline, triazoles, hydrazine, and sulfonic acid amides, and examples of the compound possessing an aliphatically unsaturated bond are ethylene, acetylene, butadiene, isoprene, 1-butene-3-yne, halogenated ethylenes, acrylate esters, methacrylate esters, ethynyl groupcontaining organosilanes, and vinyl group-containing organosilanes.

The conditions for treating the cured silicone material are arbitrary; however, the temperature is preferably 0° to 300° C., the pressure is atmospheric, elevated, or reduced and is preferably atmospheric or elevated, and the treatment time depends on the temperature and pressure and is generally several seconds to several hours.

EXAMPLES

This invention will be explained using demonstrational examples. In the examples, the quantity of hydrogen gas generated corresponds to the gas chromatographic measurement of the volume of hydrogen gas at 25° C. and 1 atm generated from the cured silicone material which is allowed to stand at a temperature of 200° C. for 1 hour.

Compositions 1 to 3 employed in the examples are given below (part is weight part).

Composition 1

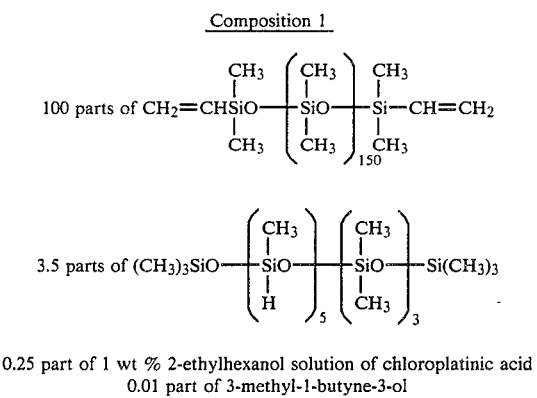

0.25 part of 1 wt % 2-ethylhexanol solution of chloroplatinic acid
0.01 part of 3-methyl-1-butyne-3-ol Composition 2

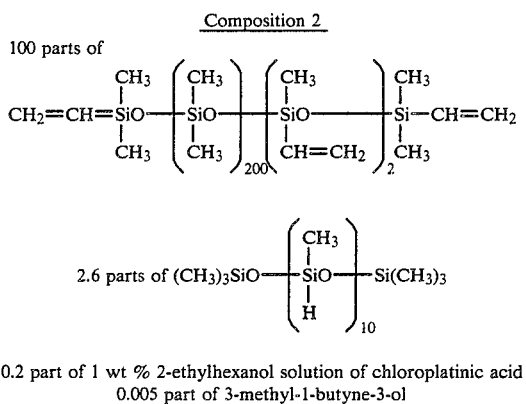

0.2 part of 1 wt % 2-ethylhexanol solution of chloroplatinic acid
0.005 part of 3-methyl-1-butyne-3-ol Composition 3

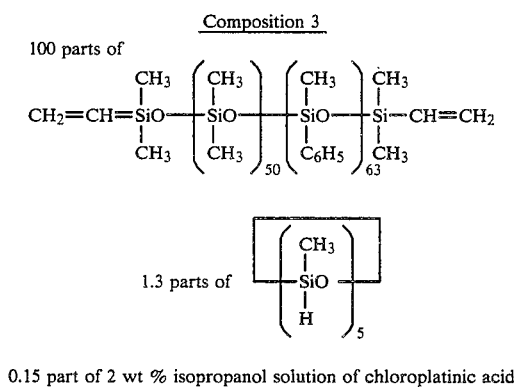

0.15 part of 2 wt % isopropanol solution of chloroplatinic acid $$0.1 \text{ part of } \left[\left(\begin{array}{c}CH_3 \\ | \\ SiO \\ | \\ CH=CH_2\end{array}\right)_4\right]$$

EXAMPLE 1

Composition 1 was allowed to stand at a temperature of 150° C. for 15 minutes in order to obtain a 1 mm thick rubber sheet.

This rubber sheet was immersed in triethylphosphine at 20° C. for 1 minute, removed, and then allowed to stand in the ambient for 2 hours. The quantity of hydrogen gas generated was then measured. The results showed that the triethylphosphine-treated sheet generated hydrogen gas at 0.2 $\mu$L/g while the untreated sheet generated hydrogen gas at 120 $\mu$L/g.

EXAMPLE 2

Composition 2 was cured into a 2 mm thick rubber sheet by the method described in Example 1, immersed in $\gamma$-mercaptopropyltrimethoxysilane at 30° C. for 2 minutes, removed, and then allowed to stand in the ambient for 1 hour. The quantity of hydrogen gas generated was then measured. The results showed that the $\gamma$-mercaptopropyltrimethoxysilane-treated sheet generated hydrogen gas at 1.2 $\mu$L/g while the untreated sheet generated 350 $\mu$L/g.

EXAMPLE 3

Composition 3 was allowed to stand at a temperature of 130° C. for 1 hour in order to obtain a 2 mm thick rubber sheet. The resulting rubber sheet was immersed in N,N-diethylaminoethanol at 25° C. for 3 minutes and then removed. The quantity of hydrogen gas generated was then measured immediately. The N,N-diethylaminoethanol-treated sheet generated hydrogen gas at 0.1 $\mu$L/g while the untreated sheet generated 20 $\mu$L/g.

EXAMPLE 4

A rubber sheet identical to that employed in Example 1 was allowed to stand at 50° C. in an ethylene gas atmosphere for 20 minutes and then taken out. The quantity of hydrogen gas generated was measured. The ethylene-treated sheet generated hydrogen gas at 2.0 $\mu$L/g.

EXAMPLE 5

A rubber sheet identical to that employed in Example 2 was immersed in 3-methyl-1-butyne-3-ol at 30° C. for 2 hours, removed, and allowed to stand in the ambient for 1 hour. The quantity of hydrogen gas generated was then measured. The 3-methyl-1-butyne-3-ol-treated sheet generated hydrogen gas at 2.5 $\mu$L/g.

EXAMPLE 6

A rubber sheet as employed in Example 2 was immersed for 2 hours in a 30 wt % acetone solution of a silane with the chemical formula

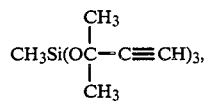

removed, and then allowed to stand in the ambient for 1 hour. The quantity of hydrogen gas generated was then measured. The silane-treated sheet generated 2.9 $\mu$L/g hydrogen gas.

EFFECT OF THE INVENTION

The method of this invention can essentially prevent down to zero the generation of hydrogen gas from cured silicone materials which have cured by the addition reaction of lower alkenyl groups with SiH in the presence of a platinum catalyst. Due to this, addition reaction-type silicones and their compositions can be employed in applications problematic in the prior art due to the generation of hydrogen gas from the cured silicone material and the invention thus has substantial implications.

That which is claimed is:

1. A method for suppressing the generation of hydrogen gas from cured silicone material which is cured by the addition reaction of lower alkenyl groups with silicon-bonded hydrogen atoms in the presence of a platinum catalyst comprising bringing the cured silicone material into contact with a gaseous, liquid, or dissolved hydrogen gas suppressing material selected from the group consisting of phosphorus compound, sulfur compound, nitrogen compound, and compound containing an aliphatically unsaturated bond, and said hydrogen gas suppressing material containing at least 0.1 weight percent phosphorus, sulfur, nitrogen, or aliphatically unsaturated bond, and thereafter removing the cured silicone material from the hydrogen gas suppressing material.

2. The method according to claim 1 in which the hydrogen gas suppressing material is a phosphorus compound.

3. The method according to claim 2 in which the phosphorus compound is triethylphosphine.

4. The method according to claim 1 in which the hydrogen gas suppressing material is a sulfur compound.

5. The method according to claim 4 in which the sulfur compound is γ-mercaptopropyltrimethoxysilane.

6. The method according to claim 1 in which the hydrogen gas suppressing material is a nitrogen compound.

7. The method according to claim 6 in which the nitrogen compound is N,N-diethylaminoethanol.

8. The method according to claim 1 in which the hydrogen gas suppressing material is a compound containing an aliphatically unsaturated bond.

9. The method according to claim 8 in which the compound containing an aliphatically unsaturated bond is ethylene gas.

10. The method according to claim 8 in which the compound containing an aliphatically unsaturated bond is 3-methyl-1-butyne-3-ol.

11. The method according to claim 8 in which the compound containing an aliphatically unsaturated bond is

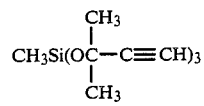

in acetone.